United States Patent
Geurts et al.

(10) Patent No.: US 10,091,428 B2
(45) Date of Patent: Oct. 2, 2018

(54) DEVICE READER AND MEANS OF GENERATING AN IMAGE THEREFOR

(71) Applicant: KONINKLIJKE PHILIPS N.V., Eindhoven (NL)

(72) Inventors: Lucas Jacobus Franciscus Geurts, Noord Brabant (NL); Pei-Yin Chao, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/645,228

(22) Filed: Jul. 10, 2017

(65) Prior Publication Data

US 2017/0310899 A1    Oct. 26, 2017

Related U.S. Application Data

(63) Continuation of application No. 14/898,992, filed as application No. PCT/EP2014/061769 on Jun. 6, 2014, now Pat. No. 9,736,382.

(30) Foreign Application Priority Data

Jun. 18, 2013 (EP) .................................. 13172424

(51) Int. Cl.
*H04N 5/232* (2006.01)
*H01Q 1/12* (2006.01)
(Continued)

(52) U.S. Cl.
CPC ......... *H04N 5/23293* (2013.01); *G06F 9/453* (2018.02); *G06T 7/73* (2017.01);
(Continued)

(58) Field of Classification Search
CPC ................................................ H04N 5/23293
(Continued)

(56) References Cited

U.S. PATENT DOCUMENTS 9,178,571 B2    11/2015   Tanaka
2007/0080229 A1   4/2007   Longacre
(Continued)

FOREIGN PATENT DOCUMENTS

WO    WO2008039559 A1    4/2008
WO    WO2013128816 A1    9/2013

Primary Examiner — Joel Fosselman
(74) Attorney, Agent, or Firm — Larry Liberchuk

(57) ABSTRACT

A device reader for receiving data from a separate device comprises a display and a first antenna for receiving data from the separate device. The first antenna has a device reader antenna position relative to the display. A display processor displays an image of at least part of the separate device on the display. The image has an associated image antenna position corresponding to a position in the image of an antenna in the separate device. The image is displayed such that the image antenna position is aligned with the device reader antenna position. The image may be determined from a non-customized image of the separate device by e.g. rotation, scaling and positioning based on a display characteristic of the display, such as specifically a size, resolution or pixel-size. The approach may facilitate a user in aligning a device with a device reader when using short-range communication, such as e.g. NFC communication.

9 Claims, 5 Drawing Sheets

(51) Int. Cl.
- *H01Q 1/24* (2006.01)
- *H04M 1/725* (2006.01)
- *H04B 5/00* (2006.01)
- *H04N 5/262* (2006.01)
- *H04N 5/38* (2006.01)
- *H04N 5/445* (2011.01)
- *G06T 7/73* (2017.01)
- *G06F 9/451* (2018.01)
- *H04N 7/18* (2006.01)
- *G06F 3/14* (2006.01)
- *G06K 9/32* (2006.01)

(52) U.S. Cl.
CPC ............ *H01Q 1/125* (2013.01); *H01Q 1/242* (2013.01); *H04B 5/0025* (2013.01); *H04M 1/7253* (2013.01); *H04N 5/2628* (2013.01); *H04N 5/38* (2013.01); *H04N 5/445* (2013.01); *G06F 3/14* (2013.01); *G06K 9/32* (2013.01); *G09G 2340/0464* (2013.01); *G09G 2370/16* (2013.01); *H04M 2250/04* (2013.01); *H04N 7/18* (2013.01)

(58) Field of Classification Search
USPC ...................................................... 348/207.1
See application file for complete search history.

(56) References Cited

U.S. PATENT DOCUMENTS

| | | |
|---|---|---|
| 2011/0309149 A1 | 12/2011 | Testa |
| 2012/0322374 A1 | 12/2012 | Yamaoka |
| 2013/0281014 A1* | 10/2013 | Frankland ............ H04W 4/008 455/41.1 |
| 2014/0065959 A1 | 3/2014 | Tanaka |

* cited by examiner

DEVICE READER AND MEANS OF GENERATING AN IMAGE THEREFOR

FIELD OF THE INVENTION

The invention relates to a device reader and to generation of an image for a device reader, and in particular, but not exclusively to a device reader and an image for aligning the device reader to another device for communication using Near Field Communication.

BACKGROUND OF THE INVENTION

Electronic appliances and devices are used in an increasing amount and variety of applications. In addition, consumer devices increasingly interwork with other devices and to enable such interworking an increased desire has arisen for communication between devices, such as e.g. personal consumer devices. For example, the advent of personal computational devices, such as smartphones, has led to a consumer's personal device being used with a variety of other devices to provide an enhanced user experience. As a specific example, a smartphone may communicate with e.g. an advanced electrical toothbrush to download usage data for presentation to the user on the display of the smartphone.

In many such applications, the communication may be achieved through the use of very short range communication links. Specifically, a communication standard known as Near Field Communication (NFC) has been developed. NFC is designed to provide very short range communication between devices. The communication may be a master/slave configuration, or may in many scenarios and embodiments be a peer-to-peer communication. NFC allows a relatively high data rate.

NFC is unlike other wireless connectivity standards in that it is only able to transfer data when within a very close proximity of another NFC device (typically less than 10 cm, and with only a few centimeters distance for most efficient communications). The data may be exchanged at a data rate of up to 424 kbits/s. This provides a number of distinct advantages over conventional data communication approaches, including:

Intuitive connections to other devices as the act of bringing devices together not only enables the connection but also makes it clear which two devices are connected. Increased security and privacy as the other connected device must be in close proximity.

Transferring data to an external computational device, which may e.g. have suitable means for providing a user interface (especially a large display), may result in improved user interaction.

For example, for a tooth brush it may enable a record of brushing activity to be kept externally, and may provide an opportunity for analysis and motivation to improve brushing.

Smartphones are becoming increasingly ubiquitous and benefits from familiar user interfaces and an excellent connectivity to the outside world. Increasingly, these devices are becoming a part of users' daily routine and people increasingly keep them close to hand at all times.

Enabling devices such as smartphones and toothbrushes with a short range communication functionality, such as NFC, enables them to communicate with each other when brought into close contact. This enables the phone to act as a computing resource controlled by an application that can e.g. monitor the external device. For example, for a toothbrush brushing performance can be evaluated, brushing targets can be set, customized feedback and coaching can be provided to the user etc. Such functionality may be enabled by the physical act of the user bringing the phone and toothbrush together, resulting in the tooth brushing application automatically being initialized and thus appearing as an application on the phone. The application can then analyze the brushing data and display results.

The use of extreme short range communications, such as NFC, to establish a communication link between two devices provides for practicality and a user interaction which is particularly suitable for many consumer applications. In particular, in the consumer segment, the approach allows for a simple and intuitive operation for coupling devices together. The user simply brings the two devices into sufficiently close contact with each other and this action allows the communication link to be automatically established. For example, in order to download brushing data from an electrical toothbrush to a smartphone, all the user needs to do is touch the toothbrush and smartphone together.

However, due to the extreme short range of communication technologies such as NFC, it is required that devices are brought together correctly and typically the quality of, and in some cases the ability to establish, a communication link is highly dependent on how the devices are brought together. For example, turning a toothbrush the wrong way may degrade the communication link substantially as a less than ideal coupling between the devices is established.

However, providing detailed instructions to users on how to specifically bring the devices together in order to optimize the communication link is often inconvenient and impractical and will be perceived by the user to be a complex and cumbersome operation. Therefore, in many cases the resulting communication link is suboptimal or indeed in many scenarios, no communication link is established due to the devices not being brought properly together, even if they e.g. are brought into contact with each other. In many scenarios, a suboptimal user experience is achieved with the user finding the operation inconvenient and difficult.

Hence, an improved approach would be advantageous and in particular an approach which facilitates the establishment of short range communication links, provides an improved trade-off between user convenience and communication quality and/or reliability, provides facilitated operation, provides increased flexibility and/or provides improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a device reader for receiving data from a separate device, the device reader comprising: a display; a first antenna for receiving data from the separate device, the first antenna having a device reader antenna position relative to the display; a display processor for displaying a first image of at least part of the separate device on the display, the first image having an associated first image antenna position corresponding to a position in the first image of an antenna in the separate device; the display processor being arranged to display the first image such that the first image antenna position is aligned with the device reader antenna position.

The invention may allow an improved user experience for a device reader and may in many embodiments provide an improved user experience when establishing a communication link between the device reader and the separate device.

For example, when establishing a communication link between a device reader and a separate device using NFC communication, the approach may provide a convenient user experience for allowing the user to easily align the devices physically. Also, typically a more accurate alignment of the physical devices can be achieved thereby allowing improved reading of the separate device.

In particular, the approach may display (at least part of) an image of the separate device on the display of the device reader and request a user to physically position the separate device over the display such that the physical separate device is aligned with the image of the separate device. This will result in the antenna of the separate device to be close to the first image antenna position. Furthermore, as the image is displayed such that the first image antenna position is aligned with the position of the first antenna, the simple user operation achieves an accurate and simple alignment of the antennas of the device reader and the separate device. Thus, the device reader provides an operation that facilitates and steers the user thereby allowing improved alignment. Furthermore, by using simple and intuitive visual directions, the user perceives the operation to be simple and easy, and avoids the need for the user to have any understanding of the technical reasons for the operation or the alignment.

A particular advantage of the approach may be for a separate device that comprises a plurality of antennas, such as NFC antennas, supporting different functions. In such embodiments, the approach may facilitate the user selecting the appropriate part of the separate device for the specific function supported by the device reader. For example, a smartphone may present different images corresponding to different parts of the separate device for different applications. Thus, depending on the application that the user initiates, the smartphone will show the part of the separate device which comprises the antenna that supports this specific function.

The alignment of the device reader antenna position and the first image antenna position may specifically correspond to a minimization of a distance between the positions. The minimization may be subject to other constraints or requirements. In some embodiments, the device reader antenna position may be a position on the display (e.g. by a projection of a center of the first antenna on the display). The first image antenna position may be a position in the first image of the first antenna. The display processor may display the first image such that the first image antenna position is positioned substantially on top of the device reader antenna position when the first image is rendered on the display.

The device reader may comprise a communication processor for receiving data over a communication link established between the first antenna and the second antenna.

The display processor may display other information in addition to the first image. For example, the first image may be overlaid by e.g. text or icons providing feedback to the user. In some embodiments, the display processor may be arranged to display user instructions instructing a user to position the separate device aligned with the display of the first image.

In some embodiments, the displayed image may comprise an image of the entire separate device. However, in many embodiments, the separate device may be larger than the display, and the first image may only represent a part of the separate device. Typically, the part displayed will include the first image antenna position, and thus a position of the second antenna will typically be proximal to the device reader when the separate device is aligned with the displayed image.

The first image may provide a visual representation of at least part of the separate device. The first image may when displayed typically provide a real sized representation of (part of) the separate device, i.e. the scale may typically be 1:1 between the separate device and the displayed image. In many embodiments, the first image may be the same as the displayed image, i.e. the resolution of the display may be the same as the resolution of the first image and each pixel of the display may correspond to one pixel of the first image. The first image may further be associated with a pixel size which is the same as the physical size of the pixels in the display.

The first image is typically a still image. The display processor may be arranged to display the first image for an extended duration, and typically for no less than 1, 2, 5, 10 or 30 seconds. The display processor may accordingly be arranged to present the first image as a still image such that the first image antenna position is aligned with the device reader antenna position.

The display processor may be arranged to display the first image independently of a movement of the device reader and/or the separate device, and the first image may be independent of the movement of the device reader and/or the separate device. Thus, the device reader may present a (semi-)permanent image of at least part of the separate device such that the first image antenna position is aligned with the device reader antenna position.

Typically, the first image may be a photo of the separate device, and may provide correct colors, marking etc. of the device. However, in some scenarios the visual representation of the separate device may be e.g. a simplified rendering such as an outline or wire model representation. In some embodiments, the first image may for example be generated from a three dimensional model of the separate device. In some embodiments the visual representation provided by the first image may include a representation of a surface characteristic, such as a texture or a marking. Specifically, the separate device may include a marking indicating the position of the antenna and the first image may include a representation of this marking. The representation may for example be a stylized representation, such as a logo representation included in a wire frame model.

The display processor may be arranged to display the image such that it is scaled, oriented (rotated), and/or positioned to result in the device reader antenna position and the first image antenna position being aligned.

In accordance with an optional feature of the invention, the device reader further comprises: an image generator for providing a second image of at least part of the separate device, the second image having an associated second image antenna position corresponding to the position in the second image of the antenna in the separate device; and an image processor for generating the first image from the second image in response to the device reader antenna position, the second image antenna position, and a display property of the display.

This may provide an advantageous operation and implementation in many scenarios. In particular, it may allow the device reader to determine a suitable image and may avoid or reduce the need for and reliance on external functionality.

The image processor may be arranged to at least one of scale, rotate, and translate the second image when generating the first image.

The image generator may specifically provide a second image which is not customized to the specific combination of the device reader and the separate device. For example, a standard photo of the separate device may be provided by the image generator. E.g. the image generator may comprise an image store which stores a standard image of the separate device together with an indication of where the second antenna is in this image, i.e. together with a stored position. The image processor may then customize the standard image to the specific combination of the device reader and the separate device.

Thus, in many embodiments, the second image may be an image which is not customized to the combination of the device reader and the separate device (and may thus be generated independently of at least one of these) whereas the first image may be customized to the combination of the device reader and the separate device.

The display processor may specifically generate the first image from the second image such that the second image antenna position in the second image will end up at a first image antenna position in the first image which when the first image is displayed on the display will end up aligned with the device reader antenna position. In many embodiments, the first image antenna position may be the position in the first image corresponding to the device reader antenna position on the display.

The display processor may in many embodiments generate the first image from the second image such that the representation of the separate device is life size when the first image is displayed on the display.

In accordance with an optional feature of the invention, the device reader further comprises: a transmitter for transmitting an indication of at least one of the device reader and the separate device to a remote server; and a receiver for receiving the second image from the remote server.

This may provide improved performance and/or facilitated implementation in many embodiments. For example, it may provide an efficient approach of obtaining suitable images which can then be locally customized for the specific combination of separate device and separate device.

In accordance with an optional feature of the invention, the device further comprises: a transmitter for transmitting an indication of at least one of the device reader and the separate device to a remote server; and a receiver for receiving the first image from the remote server.

This may provide improved performance and/or facilitated implementation in many embodiments. For example, it may provide an efficient approach of obtaining suitable images which do not need to be locally customized for the specific combination of a separate device and a separate device. Indeed, in some embodiments, the remote server may directly provide an image which is suitable for direct presentation on the display.

For example, the device reader may transmit identification data of a type or model of the device reader and/or the separate device. In response to receiving this data, the remote server may generate an image which is suitable for direct presentation on the display of the device reader, and which will accordingly provide an alignment of the first image antenna position and the device reader antenna position when displayed. For example, an image with a photo of (part of) the separate device at the resolution of the display and positioned and rotated appropriately may be provided by the remote server. The device reader may directly display this image e.g. without performing any local customization or image processing. If a user aligns the separate device with the presented image, this will then result in an alignment of the first antenna and the second antenna.

In accordance with an optional feature of the invention, the first antenna is a Near Field Communication, NFC, antenna and the apparatus comprises a communication processor for receiving data from the separate device by NFC communication using the first antenna.

The approach may provide much improved user experience when establishing NFC communications which requires antennas to be positioned very close to each other.

In accordance with an optional feature of the invention, the display processor is arranged to display the first image on the display in response to a detection of a presence of the separate device.

This may provide a particularly efficient operation and a very attractive user experience. The detection may specifically be a detection of the separate device over a wireless link using the antenna. For example, the device reader may be arranged to read data from the separate device over an NFC link, and the detection of the presence of the separate device may be by a detection of the presence of the NFC functionality of the separate device.

In accordance with an optional feature of the invention, the first image comprises a representation of at least part of the separate device that will be occluded by the device reader when the device reader is positioned in front of the separate device and the first image antenna position is aligned with the device reader antenna position.

This may provide advantageous operation in many embodiments and scenarios. In particular, it may provide advantageous operation in many scenarios where the separate device is larger than the device reader. Indeed, in many embodiments, it may be advantageous for the presented image to guide the user to establish a communication link with the device reader in front of the separate device. By presenting e.g. features that may be occluded when the device reader and separate device are optimally aligned, the user may be guided towards such optimal alignment. Specifically, the presentation of these occluded features may lead the user to seek to visually complete the visual impression of the separate device by filling in the occluded parts of the separate device by the image presented on the display. The alignment being achieved with the device reader in front of the separate device may also allow or facilitate the provision of information, such as instructions, to a user.

The device reader may specifically be in front of the separate device when the separate device does not occlude parts of the display of the device reader and/or when the device reader occludes part of the device from a viewpoint suitable for viewing the display. Indeed, the display may define a plane. The device reader may be in front of the separate device when the device reader is positioned in the volume on the side of the plane into which the display does not radiate light. The device reader may be in front of the separate device when the separate device is in the volume behind the plane formed/defined by the display.

The alignment of the first image antenna position and the device reader antenna position may correspond to an alignment of the displayed first image and the separate device.

In accordance with an optional feature of the invention, the first image comprises a representation of an outline of at least part of the separate device, or an image of the at least part of the separate device corresponding to an outline of the separate device projected on the display when the separate device is positioned in front of the device reader and the first image antenna position is aligned with the device reader antenna position.

This may provide an advantageous operation in many embodiments and scenarios. In particular, it may provide advantageous operation in many scenarios where the separate device is smaller than the device reader. Indeed, in many embodiments, it may be advantageous for the presented image to guide the user to establish a communication link with the separate device being in front of the device reader. By presenting outline information corresponding to when the device reader and separate device are optimally aligned, the user may be guided towards such optimal alignment. Specifically, the user may seek to match the edges of the separate device to the displayed outline.

The separate device may specifically be in front of the separate device when the separate device occludes parts of the display of the device reader and/or when the device reader occludes part of the device from a viewpoint suitable for viewing the display. Indeed, the display may define a plane. The separate device may be in front of the device reader when it is positioned in the volume on the side of the plane into which the display radiates light. The separate device may be in front of the device reader when the separate device is in the volume in front of the plane formed/defined by the display.

The alignment of the first image antenna position and the device reader antenna position may correspond to an alignment of the displayed first image and the separate device.

In accordance with an optional feature of the invention, the first image is a still image. In accordance with some embodiments of the invention, the display processor is arranged to display the first image as a still image.

Specifically, the first image may not be part of a video sequence or a moving image sequence, and the display processor may not render a moving image sequence but rather present a single still image for an extended duration. Specifically, the first image may be presented in connection with a communication link setup, and the first image may be presented until the communication link setup is terminated (e.g. successfully or unsuccessfully).

In accordance with an optional feature of the invention, the display processor is arranged to display the first image independently of a movement of the device reader.

The first image and the displaying of the first image may specifically be independent of any movement or position of the separate device and/or the device reader.

The first image may specifically represent the desired target scenario which reflects the desired relative positioning of the device reader and the separate device. Thus, the presented first image may not reflect the current situation or the current positions but rather reflect the end goal which is independent of the current conditions.

In accordance with an optional feature of the invention, the alignment between the first image antenna position and the device reader antenna position is independent of a position of the device reader and of a position of the separate device.

According to an aspect of the invention there is provided an apparatus for generating a first image for displaying on a display of a device reader further comprising a first antenna for receiving data from a separate device, the first antenna having a first image antenna position in the first image, the apparatus comprising: an image generator for providing a second image of at least part of the separate device, the second image having an associated second image antenna position corresponding to a position in the second image of an antenna in the separate device; and an image processor for generating the first image from the second image in response to the first image antenna position, the second image antenna position, and a display property of the display.

The approach may allow an image to be generated for a device reader which can substantially facilitate proper alignment of a device reader and a separate device, e.g. to establish an NFC communication link.

The image generator may specifically provide a second image which is not customized to the specific combination of the device reader and the separate device. For example, a standard photo of the separate device may be provided by the image generator. E.g. the image generator may comprise an image store which stores a standard image of the separate device together with an indication of where the second antenna is in this image, i.e. together with a stored position. The image processor may then customize the standard image to the specific combination of device reader and separate device.

Thus, in many embodiments, the second image may be an image not customized to the combination of device reader and separate device (and may thus be generated independently of at least one of these) whereas the first image may be customized to the combination of device reader and separate device.

The display processor may specifically generate the first image from the second image such that the second image antenna position in the second image is positioned in the first image at the first image antenna position. In many embodiments, the second image antenna position may be the actual position of the antenna in the second image and the first image position may be the corresponding target position for the antenna in the first image, where the target position corresponds to the position of the antenna of the device reader in the first image.

The display processor may in many embodiments generate the first image from the second image such that the representation of the separate device is life size when the first image is displayed on the display.

The first image antenna position may be a position of the antenna of the device reader in the first image when the first image is presented on the display of the device reader.

The image generator and/or the image processor may be part of (comprised in) the device reader itself or may e.g. be part of a remote server.

In accordance with an optional feature of the invention, the image processor is arranged to generate the first image to include a part of the second image including the second image position, the part of the second image being positioned to substantially minimize a distance between the first image antenna position and the second image antenna position in the first image.

This may allow improved alignment in many embodiments and scenarios.

In accordance with an optional feature of the invention, the image processor is arranged to include at least a part of the second image in the first image after applying an image operation to the least part of the second image, the image operation being selected from the group of: a translation; a rotation; and a scaling.

This may provide a particularly advantageous generation of the first image in many embodiments.

In accordance with an optional feature of the invention, the display property comprises at least one property selected from the group of: a size of the display; a pixel size of the display; an orientation of the display; and a resolution of the display.

This may provide a particularly advantageous generation of the first image in many embodiments.

In accordance with an optional feature of the invention, the apparatus is remote from the device reader, and the apparatus further comprises a transmitter arranged to transmit the second image to the device reader.

This may provide improved performance and/or facilitated implementation in many embodiments. For example, it may provide an efficient approach for obtaining suitable images that do not need to be locally customized for the specific combination of device reader and separate device. Indeed, in some embodiments, the remote server may directly provide an image which is suitable for direct presentation on the display.

The apparatus is remote from the device reader and thus neither the image generator nor the image processor may be part of (comprised in) the device reader itself. The device reader and remote apparatus may communicate with each other via a communication network, e.g. including the Internet.

In accordance with an optional feature of the invention, the apparatus comprises a receiver arranged to receive an indication of the device reader from the device reader; and the image processor is arranged to determine the display property in response to the indication.

This may allow improved and/or facilitated operation and/or implementation in many embodiments.

In some embodiments, the apparatus comprises a receiver arranged to receive an indication of the display property from the first device; and the image processor is arranged to determine the display property in response to the indication.

This may allow improved and/or facilitated operation and/or implementation in many embodiments.

In accordance with an optional feature of the invention, the apparatus comprises a receiver arranged to receive an indication of the separate device from the device reader; and the image generator is arranged to generate the second image in response to the indication.

This may allow improved and/or facilitated operation and/or implementation in many embodiments.

In accordance with an optional feature of the invention, the apparatus is comprised in the device reader.

This may provide an advantageous operation and implementation in many scenarios. In particular, it may allow the device reader to determine a suitable image and may avoid or reduce the need for and reliance on external functionality.

According to an aspect of the invention there is provided a method of operation for a device reader operable to receive data from a separate device and comprising a display and a first antenna for receiving data from the separate device and having a device reader antenna position relative to the display; the method comprising: displaying a first image of the separate device on the display, the first image having an associated second first image antenna position corresponding to a position of an antenna in the separate device wherein the first image is displayed such that the first image antenna position is aligned with the device reader antenna position.

According to an aspect of the invention there is provided a method of generating a first image for displaying on a display of a device reader, the device reader comprising a first antenna for receiving data from a separate device, the first antenna having a first image antenna position in the first image; the method comprising: providing a second image of at least part of the separate device, the second image having an associated second image antenna position corresponding to a position in the second image of an antenna in the separate device; and generating the first image from the second image in response to the first image antenna position, the second image antenna position, and a display property of the display.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a device reader for reading data from a separate external device over an NFC communication link. However, it will be appreciated that the invention is not limited to any specific application or communication link.

Figure 1:
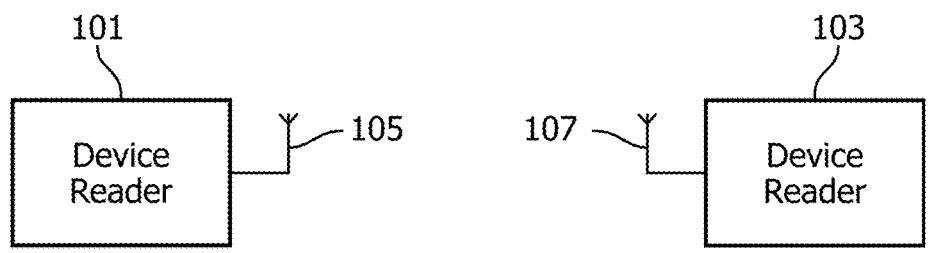
FIG. 1 illustrates an example of a system comprising a device reader reading a separate device over a wireless short range communication link.

FIG. 1 illustrates an example of a device reader 101 and a separate device 103 being read by the device reader 101 (i.e. it receives data from the separate device 103). The device reader 101 is arranged to receive data from the separate device 103 over a short range radio communication link and specifically over an NFC communication link. In order to support the short range communication, the device reader 101 comprises a first antenna 105 and the separate device 103 comprises a second antenna 107. The antennas 103, 105 may typically be inductors, such as planar coils formed on a suitable substrate.

The communication between the separate device 103 and the device reader 101 is accordingly only possible when the two antennas 105, 107 and thus the two devices 101, 103 are very close together (typically 10 cm or significantly less). In fact, the communication between the device reader 101 and the separate device 103 is generally initialized by a user by bringing the two devices 101, 103 close together, typically by "touching" them together.

As an example, the device reader 101 may be a personal computing device, such as a smartphone or a tablet, and the separate device 103 may be a suitable consumer appliance or device, such as a toothbrush. The smartphone may in such an example read usage data from the toothbrush via the NFC communication link, and this data may then be analyzed, presented or otherwise used by the smartphone. The download of the usage data may be initialized by a simple operation of touching the smartphone and the toothbrush together thereby providing a very simple and intuitive user operation and experience.

However, in order to optimize the communication it is desirable to optimize the coupling between the antennas (which are typically implemented as inductors, such as planar coils). Indeed, it is generally desirable to minimize the length of the communication path, and in many embodiments it is desirable to position the antennas so close together that they couple as inductors of a loosely coupled transformer rather than function as traditional radio frequency antennas. The reliability and capacity of the communication link is typically highly dependent on the coupling between the antennas, and it is not atypical for reliable NFC communications to require the antennas to be within a few centimeters of each other.

However, this requirement also complicates the operation for the user. For example, many devices are relatively large compared to the desired inter-antenna distance and consequently the mere bringing together of the devices cannot guarantee that a reliable communication link is formed. Rather, the quality of the communication link will also depend on exactly how the devices are brought together, as well as where the antennas are positioned in the devices etc. The user is typically not aware of such details, and accordingly the communication link may not be established or may be of inferior quality.

Indeed, it has been found that users in general have a lot of difficulty in touching two devices together to form a reliable connection in cases where one or both of the devices have a (hidden) NFC spot (i.e. antenna position). The location and size of the NFC antenna is typically different depending on specific device type, size etc. Also in the many devices, the NFC antenna is very small (e.g. in a watch or toothbrush) and the location may vary depending on the use case.

The device reader 101 comprises functionality for assisting the alignment of the two devices 101, 103 by the user, and in particular it allows the user to achieve an optimized alignment of the devices 101, 103 using a very simple and intuitive user operation and without requiring the user to have any knowledge or considerations of the detailed properties of the devices (such as the positions of the devices) or of the optimized alignments.

Figure 2:
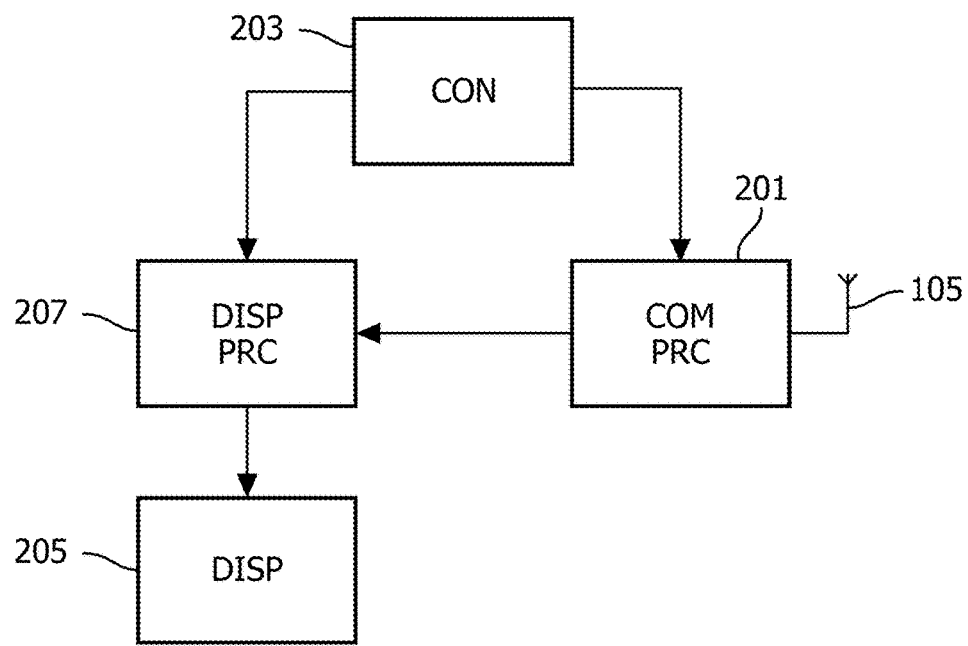
FIG. 2 illustrates an example of elements of a device reader in accordance with some embodiments of the invention.

FIG. 2 illustrates elements of the device reader 101 in more details.

The device reader 101 comprises the antenna 105 (henceforth referred to as the first antenna 105). The first antenna 105 is an NFC antenna and may specifically be implemented as a planar coil of suitable dimensions. The first antenna 105 is coupled to an NFC communication processor 201 which is arranged to receive data from the separate device 103 via NFC communication. The communication may be a master/slave configuration (such as when reading an RFID tag using NFC), or may in many scenarios and embodiments be a peer-to-peer communication. Thus, the NFC communication processor 201 may be arranged to support peer-to-peer communication, or one way master/slave configurations as appropriate.

The device reader 101 also comprises a device controller 203 which is arranged to implement the majority of functions of the device. For example, the device controller 203 may execute applications, control the operation of the device reader 101 etc. as required or desired for the individual embodiment and application.

Specifically, the device controller 203 may receive the data from the separate device 103 from the communication processor 201, and may proceed and analyze this data to provide user feedback. For example, in the example where the separate device 103 is a toothbrush, the device controller 203 may e.g. calculate average brush times etc. and present these to the user.

The device reader 101 further comprises a display 205. The display 205 is positioned on the device and may for example be positioned on one side of the device reader 101. E.g., in the example where the device reader 101 is a smartphone, the majority of one side of the device reader 101 may be taken up by the display 205.

The display 205 is coupled to a display processor 207 which is operable to drive the display 205 to present various display images. The display processor 207 is coupled to the device controller 203 which is capable of controlling the display processor 207 to present the required image. Specifically, the display processor 207 may be arranged to (at times) present a still image on the display 205.

The first antenna 105 and the display 205 are part of the device reader 101, and in the example both are located within or on the surface of an enclosure forming the device reader 101. The first antenna 105 accordingly have a position relative to the display 205. The position will be referred to as the device reader antenna position. In some embodiments, the device reader antenna position can be considered as a three dimensional position (e.g. relative to a reference point on the display) but in many embodiments the position may be considered as a two dimensional position, such as e.g. the image position of the point or pixel of the display which is closest to (the center of) the first antenna 105.

In the system of FIG. 2, the display processor 207 is arranged to display a still image of the separate device 103 on the display 205 in order to support the user alignment of the devices. The image may in some embodiments be an image of the entire separate device 103 but will in most embodiments or scenarios be an image of part of the separate device 103. The displayed image will henceforth be referred to as the first image.

The separate device 103 comprises the second antenna 107, typically internally but possibly disposed on or near a surface of the separate device 103. The second antenna 107 is typically relatively small compared to the size of the separate device 103. The second antenna 107 is associated with a position in the image of the separate device 103 (i.e. in the first image), and this position is referred to as the first image antenna position. Thus, the first image antenna position may typically correspond to a position in the first image of the (at least part of) the separate device 103 at which the antenna 107 would be seen if the other parts of the separate device 103 were transparent. The first image antenna position may typically correspond to the point in the first image which falls on the sightline from the viewpoint of the first image to the center of the second antenna 107.

The first image antenna position thus represents the position of the second antenna 107, i.e. of the antenna in the separate device 103. This image position is thus a fixed position in the first image. Indeed, there is a specific image position in the first image which corresponds to the position of the second antenna 107 in the separate device, and as the position of the second antenna 107 is fixed in the separate device 103, the display position corresponding to the first image antenna position is also a fixed and unchanging position. The first image antenna position may specifically be given as e.g. a (two dimensional) image or pixel coordinate in the first image (e.g. relative to a corner of the first image). Thus, specifically, the first image antenna position may be a specific fixed image coordinate in the image.

The display processor 207 is arranged to display the first image such that the first image antenna position is aligned with the device reader antenna position. Specifically, the first image may be displayed such that the first image antenna position substantially coincides with the second antenna position.

Thus, the still image of the separate device 103 (the first image) is not just displayed directly but rather is displayed with the specific constraint and requirement that in the resulting displayed image, the position corresponding to the position of the antenna of the external device (the first image antenna position) is aligned with the actual physical position of the antenna of the device reader 101, i.e. with the position of the first antenna. The display of the first image is such that the resulting physical position on the display 205 of the first image antenna position is aligned with the physical position of the first antenna 105. The device reader 101 accordingly displays the image of the separate device 103 such that the position in the image corresponding to the antenna of the separate device is displayed at a physical position on the display which is aligned with the physical position of the antenna of the device reader 101. Specifically, by controlling how the first image is displayed, the image position corresponding to the antenna of the separate device 103 (the first image antenna position) can be positioned as close to the physical position of the antenna in the device reader 101 as possible.

In many embodiments, the alignment may be achieved by the image being rotated, scaled, and positioned such the distance between the position of the first antenna 105 (e.g. as projected on the display and corresponding to the device reader antenna position) and the first image antenna position in the rendered image is minimized. Indeed, in many embodiments, the alignment may be such that the distance between the position on the display of the first image antenna position and the projection of the device reader antenna position on the display is minimized (potentially subject to other restrictions or constraints or within a given degree of accuracy).

Specifically, the display of the first image may be such that the first image antenna position in the first image coincides with corresponding device reader antenna position on the display 205. The corresponding device reader antenna position may e.g. be the projection of a (three dimensional) device reader antenna position on the display (e.g. with the projection being along the direction of the shortest distance between the antenna and the display 205, along a direction perpendicular to a plane of a planar coil forming the first antenna 105, or along a direction perpendicular to a display plane of the display 205).

As a result, the first image is presented to provide a very strong guide to the user of how the devices should be positioned relative to each other in order to optimize the coupling between the antennas.

Specifically, a still image of the separate device 103 is presented which illustrates a positioning of the separate device 103 relative to the device reader 103 which in many scenarios corresponds directly to the shortest distance between the antennas 105, 107, and thus to the maximum coupling between these. Accordingly, by simply trying to replicate the still image (i.e. by matching the physical separate device to the presented still image of the device), the user will automatically optimize the antenna coupling. In fact, the presented still image can be considered to reflect the optimum or desired positioning of the devices relative to each other, i.e. the presented still image represents the target scenario for the user. The user will intuitively and automatically seek to achieve this target arrangement of the devices thereby automatically, and indeed in many scenarios even without being aware of it, maximizing the coupling between the antennas 105, 107. In fact, the user does not even have to be aware that he is performing a task of maximizing coupling between antennas, where the antennas are positioned in the devices, or indeed even that the devices 101, 103 comprise any antennas 105, 107. Rather, the user is presented with a picture on a display and merely intuitively seeks to replicate this picture. The approach accordingly is highly suitable for a variety of users and consumers that often have little or no understanding or knowledge of the underlying technical features and functions enabling the specific applications.

Indeed, in many scenarios, the first antenna 105 will typically be very small compared to the size of the separate device 103 resulting in it being insufficient for the user to merely hold the devices together randomly as this could result in the antennas 105, 107 being far apart despite the devices 101, 103 themselves being close. However, the displayed image provides a very simple and intuitive guide to the user of how to bring the devices 101, 103 together. Indeed, the presentation of an image of the separate device 103 on the display 205 will automatically and subconsciously cause the user to position the separate device 103 in a similar fashion. Thus, although instructions may be provided to the user, the user will typically not even require these in order to perform the desired operation. Indeed, the user may optimize the coupling between the devices without having any knowledge of doing so or any knowledge of the involved technical considerations or characteristics.

In some embodiments, the first image may automatically be displayed when the presence of the separate device 103 is detected by the device reader 101. The detection may for example be a detection of the presence of the NFC communication function of the separate device 103 by the communication processor 201.

As an example, the user may desire to transfer data from a toothbrush to a smartphone and may therefore begin to bring the devices together. At some point, the smartphone will detect the presence of the toothbrush and in response it will present an image of the part of the toothbrush where the NFC antenna is positioned. Thus, the user will experience that as he is bringing the toothbrush and the smartphone together, the display of the smartphone will suddenly show an image of a part of the toothbrush. The user will proceed to align the toothbrush and smartphone together such that the physical toothbrush will be aligned with the image on the display. By doing so, the user will automatically (and typically without knowing it) optimize the coupling between the NFC antennas, and thus optimize the coupling.

In essence, the user will experience a scenario where he will complete the image of part of the separate device 103 by positioning the separate device 103 to overlap the display 205 (or the display to overlap the separate device 103). Examples of this are in FIGS. 3 and 4. When seeing the image of part of the separate device 103 on the display, the user will seek to match that part image with the full visual image of the physical separate device 103. By doing so, the user will due to the alignment of the device reader antenna position (of the antenna 105 of the device reader 101) and the first image antenna position (of the antenna 107 of the separate device 103) optimize the communication link, thereby allowing an improved and more reliable data transfer.

Figure 3:
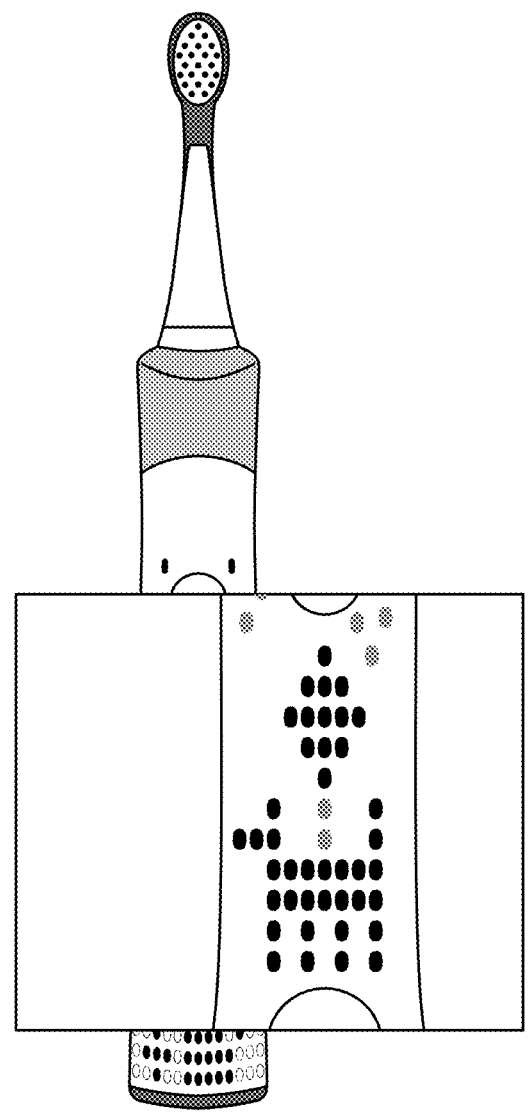
FIGS. 3 and 4 illustrates an example of user alignment of a separate device and a device reader in accordance with some embodiments of the invention.
Figure 4:
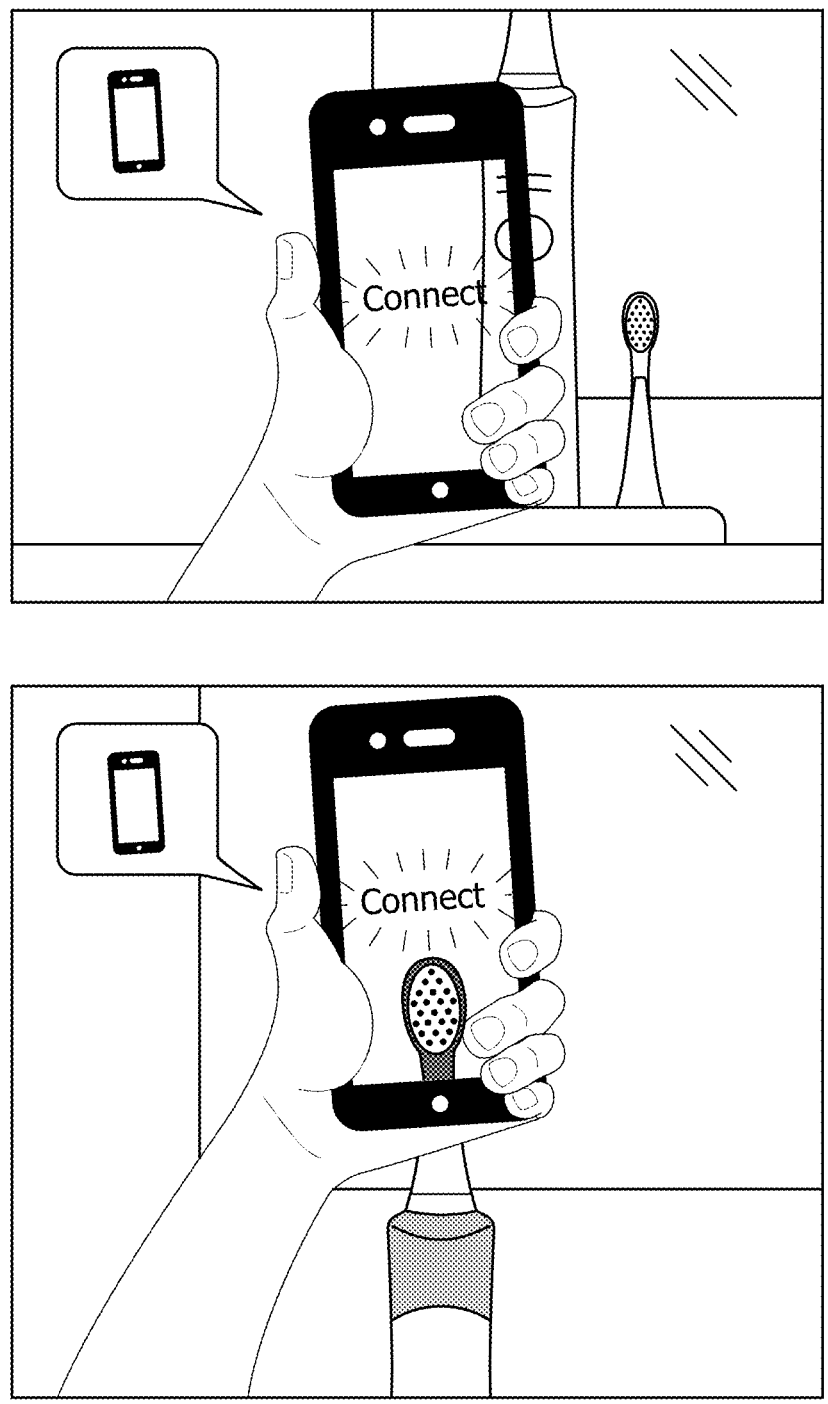

It will be appreciated that whereas FIGS. 3 and 4 illustrate examples wherein the device reader 101 (in the form of a smartphone) is positioned in front of the separate device 103 (in the form of a toothbrush), the alignment may in other embodiments or scenarios be achieved by the separate device 103 being positioned in front of the device reader 101. Indeed, for many practical devices which tend to be relatively thin (such as a smartphone) it will not be significant whether the separate device 103 is in front or behind the display/image.

It is noted that an advantage of the described approach is that it may be used both for applications wherein the device reader 101 is in front of the separate device 103 as well as for scenarios in which the separate device 103 is in front of the device reader 101. The display of a single still image of the separate device 103 on the device reader 101, where the image represents the desired target scenario or arrangement, is applicable to both scenarios. Indeed, in many scenarios, the desired (or at least an acceptable) alignment will occur for a given device reader 101 and separate device 103 both in the case where the user positions the separate device 103 in front of the device reader 101 and in the case where the user positions the separate device 103 behind the device reader 101. Specifically, when the device reader 101 is a thin device, such as is typically the case for e.g. mobile phones, the antenna coupling is relatively independent of whether the separate device 103 is on one or the other side of the device reader 101. Therefore, users may simply match up the separate device 103 to the displayed image and the resulting operation will be not be significantly affected by whether the individual user chooses to do so with the separate device 103 in front of or behind the device reader 101.

In some scenarios, one or both of the antennas may be positioned such that it is preferred that the separate device 103 is in front (or alternatively behind) the device reader 101. In such scenarios, the user may e.g. be instructed to perform the alignment such that the desired order of the devices is achieved. The instructions may be statically provided, such as instructions in a manual provided with the separate device 103, or may in some embodiments be provided dynamically on the display. For example, as part of determining the first image, the device reader 101 may determine whether it is significant for the separate device 103 to be in front or behind the device reader 101. If not, no specific instructions are provided. However, if it is significant, instructions may be provided to the user to perform the desired operation. For example, the text "Please position the smartphone in front of the toothbrush such that the toothbrush lines up with the image on the display." may be presented on the display.

The approach may provide a substantially improved user experience. E.g. whenever a user needs to touch a physical product to a device reader, an image is presented on the display of the device reader showing part of the physical product. The image is typically presented such that it is scaled, rotated and positioned in order for the representation of the product to have a natural size when displayed and such that when the image part on the display and the physical product appearance align to look like one image, the NFC antennas of the device reader and the product will be aligned. Indeed, in many applications, the on-screen image part looks to the user like a 'puzzle piece' that needs to be completed. The image may in many scenarios have the same color etc. as the product and may indeed be selected to match the physical product as much as possible.

The first image is specifically a still image of all or part of the separate device 103, such as a photo, drawing or outline of the separate device 103. The first image is displayed as a still image, i.e. the display 205 is driven to display a still image of (at least part of) the separate device 103. The displayed image is thus a fixed, static and permanent image which is displayed on the display 205 during the user operation. Specifically, when the communication setup is initialized, the display processor 207 renders the first image on the display 205. The rendered image is then permanently displayed until the communication setup is terminated (whether successfully by the communication being established or unsuccessfully by the communication setup being abandoned). The first image is accordingly a fixed or static still image which is continuously displayed during the process.

The first image which is rendered on the display 205 is thus a static, still image which is displayed for an extended period of time. The first image may specifically be displayed for at least 1 second, and typically significantly longer, such as no less than 2, 5, 10 or 30 seconds.

The displayed first image is specifically a still image and is not an individual image or frame of a sequence of images, such as a video sequence or moving image sequence. Rather, a (semi-)permanent image is rendered.

The displayed image represents the desired or target scenario and does not reflect the current relationship between the device reader 101 and the separate device 103. The image is accordingly not an image which is continuously updated but rather the same still image is constantly presented for an extended time interval. Specifically, the image does not vary as a function of the position or movement of the device reader 101, or of the separate device 103. Indeed, the approach utilizes that the displayed image remains the same as the device reader 101 and/or separate device 103 are moved. Indeed, the image is a constant image representing the target scenario/end goal and this remains constant while the user moves the device reader 101 and/or the separate device 103 in order to achieve this target situation.

Also, it is noted that the alignment between the first image antenna position and the device reader antenna position is constant for the displayed image, and that this alignment does not change as long as the first image is presented. In particular, the alignment between the first image antenna position (in the displayed image) and the device reader antenna position is independent of any movement or position of the device reader 101 and/or the separate device 103.

Rather, as the first image is permanently displayed, the display position corresponding to the first image antenna position is also constant, i.e. the same point on the display 205 (e.g. the same pixel) corresponds to the first image antenna position throughout the process. As the position of the first antenna 105 is also constant, the relationship between all the positions remains constant. Specifically, the relative positions do not change as the separate device 103 or the device reader 101 are moved by the user.

In many embodiments, the first image is a predetermined image which may have been generated prior to it being displayed, i.e. it is typically not an image captured in connection with the alignment process.

In many embodiments, the device reader 101 may comprise an image store (or the image store may be remote) and the first image may be an image stored in the image store. The first image may in such an example be retrieved from the image store and presented by the display processor, i.e. the first image may be a stored image. In most embodiments, the image of the separate device 103 is an actual photo of the physical device reader 101. However, it will be appreciated that this is not essential and that in other embodiments, the image may for example be a drawing or an outline image only showing the outline of the separate device 103.

The device reader 101 may thus operate in such a way that it provides an output that guides a user to perform the correct movement when using NFC to establish a connection between a device reader 101 and a product (the separate device 103).

The approach may reduce a problem which is perceived as one of the most significant in the development of user friendly applications using NFC communication. Namely, it has been found that touching a product and an NFC device reader at the right spot is frustrating to many casual users. Such products may be handheld and relatively small such as e.g. a toothbrush, or a stationary apparatus such as an espresso machine. When instructed to touch a specific NFC spot (where the antenna is located) with an NFC enabled mobile phone, experiments have shown that many people find this to be a very frustrating experience. Often, they are not able to locate the spot accurately and the operation often results in a mismatch of the two antenna areas (of the product and the device reader).

Further investigation has revealed that these issues are typically related to a number of issues. Specifically, it was found that there is a lack of standardization of the orientation, location and size of the NFC area in a mobile device, such as a mobile phone or tablet. Moreover, the size of mobile devices can vary substantially, such as e.g. from smartphones with small screens (say 3.5 inch screens) up to large tablets (e.g. up to 20 inch screens). Relative to the size of the product or device reader, the appropriate NFC spot can be very small which makes 'hitting' the target difficult. The coupling is further dependent on the orientation of the devices and the antennas in the devices, which further complicates the operation. For example, when the device reader is touching the product at a suboptimal angle, the chances of receiving information via NFC will be reduced. Also, the operation of touching a product with e.g. a mobile phone seems unusual and non-conventional to many people.

The described approach of displaying a part of the image of the product on the display such that when the user "completes the image" by aligning the product and the device reader, the antennas will be appropriately aligned, has been found to address most or all of these issues. Furthermore, it typically achieves a very intuitive reaction from the user who experiences the action of aligning the devices as a simple and straightforward every day action rather than a specific technical operation. Indeed, the approach has been evaluated in practice where it was found that the operation of the device reader 101 resulted in a user experience and operation that was considered to be very natural and easy. It was also found that the quality of the resulting communication link on average was significantly improved.

The approach may for example provide particularly advantageous operation for devices that have a plurality of internal antennas which can be read by a device reader. For example, different antennas may be used to provide different positions on the device which can be used for providing different functions. In such scenarios the image may be selected to show the part of the separate device which comprises the antenna supporting the specific function of the current application supported by the separate device 103.

For example, appliances may have many internal antennas that will trigger different features on a smartphone when this is brought into proximity with the individual antenna. E.g. a coffee machine may have a control NFC spot, which when touched will show the control user interface. In addition, it may have a different NFC spot to start a diagnostic application on the smartphone. It may further have a third NFC spot that can trigger the presentation of the user manual. An advantage of the described approach is that a user will be clearly be directed towards the appropriate NFC spot.

In some embodiments, the device reader 101 may itself generate the first image based on locally stored information and local processing. An example of such a device reader 101 is illustrated in FIG. 5 which corresponds to the device reader 101 of FIG. 1 with functionality for creating the first image.

Figure 5:
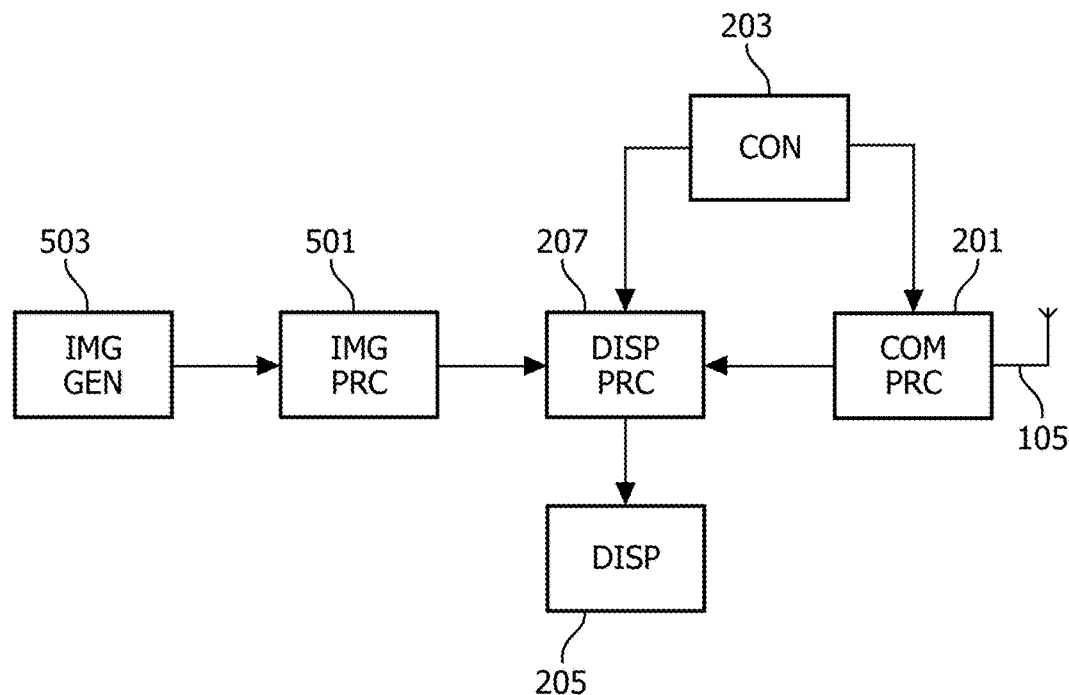
FIG. 5 illustrates an example of elements of a device reader in accordance with some embodiments of the invention.

In addition to the example of FIG. 1, the device reader 101 of FIG. 5 comprises an image processor 501 which is coupled to the display processor 207. The image processor 501 is arranged to generate the first image from a second image by applying image operations to the second image. The image processor 501 is further coupled to an image generator 503 which provides the second image to the image processor 501.

In the example, the second image is an image of (at least part of) the separate device 103 which is not customized to the specific combination of the device reader 101 and the separate device 103. From the non-customized second image, the image processor 501 generates a first image which is customized to the specific combination of the device reader 101 and the separate device 103.

The second image may thus typically be a standard image of the separate device 103 which has not been customized to the specific characteristics of the device reader 101, and specifically which has not been customized to the display characteristics and the antenna position of the device reader 101. Specifically, the second image may be a stock image of the separate device 103 which is generated independently of the device reader 101 and which can be used by a range of different device readers. The display processor 207 may be arranged to generate the first image as an image which is customized to the device reader 101 by adapting the second image.

The second image will have a corresponding second image antenna position which corresponds to the position of the antenna 107 in the separate device 103. This position will typically be provided as separate position data, such as meta-data specifying an x,y position of the second antenna 107 in the second image. The display processor 207 will further have information which provides the device reader antenna position. For example, data may be (e.g. permanently at manufacturing) stored in the display processor 207 which defines an x,y position on the display that corresponds to the desired optimal position of the NFC antenna of a separate device when performing NFC communications.

Specifically, the position on the display which is closest to (e.g. the center of) the first antenna 105 may be stored in the display processor 207. The display processor 207 may then proceed to generate the first image by including at least part of the second image such that the second image antenna position will align with the device reader antenna position when the first image is displayed on the display 205.

Specifically, at least part of the second image may inserted/copied into the first image such that the part of the second image at the second image antenna position is positioned on a first image antenna position which corresponds to the device reader antenna position.

Thus, the second image antenna position is inserted at an x,y position in the first image which corresponds to the stored x,y position for the display.

The first image may be arranged to have the same pixel dimensions as the display 205. In such a case, the first image antenna position and the device reader antenna position may both be given in terms of pixel coordinates of the display, and the first image may specifically be displayed such that the first image antenna position is at the same pixel position as the device reader antenna position. The device reader antenna position may be stored as pixel coordinates in the first image, and the display processor 207 may insert the second image such that the second image antenna position indicated by the associated meta-data for the second image will coincide with the pixel position indicated by the pixel coordinates of the device reader antenna position.

This approach may result in the first image being presented to the user such that if the user proceeds to align the separate device 103 with the image on the display, the alignment of the devices will be as desired, and thus it will tend to result in the optimal positioning of the antennas 105, 107 relative to each other.

In many embodiments, the display processor 207 may perform a scaling of the part of the second image which is inserted into the first image. Indeed, in order to facilitate and optimize the operation by the user, the representation of the separate device 103 in the first image is such that it has substantially the same size as the physical device itself when the first image is displayed. Accordingly, the display processor 207 may scale the second image when inserting it in the first image. The scale factor may be such that the resulting representation on the display is approximately life size.

The determination of the scale factor may be determined from knowledge of a characteristic, such as a pixel size or total size of the display. For example, the total size of the display and the pixel resolution may be known for the display. Furthermore, a scale of the second image may be known, e.g. in the form of a pixel size or a total size of the image. The scaling may then be determined to correct for any differences. For example, the scaling factor may be set as the ratio between the pixel size of the second image and the pixel size of the first image.

Thus, the first image is generated such that when it is displayed on the display the visual representation of the separate device 103 will be substantially life size (say within 5%). The scaling of the second image is accordingly such that the display of the first image will result in a 1:1 scale representation of (at least part of) the separate device 103.

The scaling may be determined on the basis of information relating to characteristics of the second image, the first image and the display 205. For example, data describing the pixel dimensions for the second image, the first image and the display may be provided and used.

As a specific example, the second image may be provided with information which indicates that each pixel corresponds to a physical dimension of, say 0.2 mm×0.2 mm. The display may have a physical pixel dimension of, say, 0.1 mm×0.1 mm. The physical pixel dimension for the first image may be calculated based on the relationship between pixels of the first image and of the display. In many embodiments, the first image may directly correspond to the displayed image, i.e. it may be generated to have the exact same pixel resolution. For example, if the display 205 has a resolution of 1000 by 1500 pixels, the first image may be generates as a 1000 by 1500 pixel image that can be displayed directly. In this case, the physical dimension of the pixels of the first image is also 0.1 mm×0.1 mm. Accordingly, the scaling of the second image will be such that each pixel of the second image will correspond to four pixels of the first image thereby resulting in the display of the first image providing a life size representation of the separate device 103.

Thus, in order to determine the first image from the second image, the display processor 207 may use information for the second image relating this to the physical dimensions represented. For example, a corresponding physical size for pixels, a pixel density (e.g. dpi), or a total resolution and physical image area may be provided and used by the display processor 207.

In some embodiments, meta-data may be provided with the second image indicating relevant characteristics of the second image. Further such meta-data may e.g. provide information indicative of e.g. distinctive locations on the surface which allows selection of the best image e.g. by rotating the second image in a manner that provides a more distinctive character. In some embodiments, specific positions may alternatively or additionally be identified in the second image by image processing; e.g. by detecting salient features such as dots or edges. By explicitly providing such information using meta-data, a more accurate operation can often be achieved. For example, if the surface of the separate device has e.g. repetitive structures that easily alias, image processing may provide inaccurate or ambiguous detection.

In some embodiments, the image processing parameters may be determined based on a user input. For example, the first time a second image is used, the device reader 101 may scale the second image such that the whole image can be shown on the display. The user may then be asked to hold the separate device 103 close to the display and manually scale the image on the display until it has the same size as the physical separate device 103 (e.g. using a dedicated user button or using pinch-and-zoom finger operations on a touch display). If the device reader 101 has information of the desired first image antenna position (the first image antenna position can be considered the target position for the second image antenna position when generating the first image) as well as of the second image antenna position, the system may then proceed to generate the first image by positioning the scaled second image such that the first and second image antenna positions coincide in the first image.

In some embodiments, the position may also be based on user inputs. For example, after having scaled the image, the user may be presented with an indication of the communication quality of the NFC communication link (e.g. derived from a signal strength or an error rate), and asked to move the device reader 101 and the separate device 103 relative to each other, as well as moving the image on the display, until an optimal quality is obtained. The resulting scaling and position of the second image may then be stored and used for future coupling operations allowing the display processor 207 to generate the corresponding image in the future.

In such embodiments, the result of the user alignment (as well as for example future alignments between the separate device 103 and the device reader 101) may be captured. The resulting data may for example be uploaded to a remote server where it can be stored. Other device readers may then retrieve the information from the remote server and use this directly to customize the image thereby avoiding the need for these to be individually calibrated. In such embodiments, the data may for example be uploaded together with the image itself.

Also, in some embodiments, the second image may be generated locally at the device reader 101. In such cases, the second image may be uploaded to the remote server for other device readers to access, typically together with the adjustment or calibration data. For example, the user may take a photo of the separate device, e.g. using a smartphone comprising the device reader. This photo may then be adjusted manually by the user to ensure appropriate alignment. The resulting image, and/or the original photo together with the adjustment data may then be uploaded to the remote server for other device readers to use.

In some embodiments, the photo may be sent to the remote server which may then proceed to generate the first image, e.g. using image recognition etc.

In some embodiments, the resulting first image may be stored and directly displayed whenever an NFC communication link is set up with the separate device 103 in the future.

Thus, the approach allows the device reader 101 to generate a customized image that can be used to assist the user in properly aligning devices. It also provides an efficient approach for determining the display characteristics and antenna positions (at least relative to each other) such that the appropriate image can be presented.

In some embodiments, the display processor 207 may also be arranged to rotate the second image when inserting elements (or the entire image) thereof into the first image. For example, the second image may be angled in a desired direction that achieves the most convenient coupling.

The approach may in some embodiments and scenarios be used to guide the user to establish a link between the NFC antennas 105, 107 by positioning the separate device 103 in front of the device reader 101. In other embodiments and scenarios, the user may be guided to establish a link between the NFC antennas by positioning the separate device 103 behind the device reader 101.

The latter case is illustrated by the examples of FIGS. 3 and 4. This approach is often preferable in scenarios wherein the separate device 103 is bigger than the device reader 101 (in at least one direction). In such cases, as shown e.g. in FIGS. 3 and 4, part of the separate device 103 will be visible behind the device reader 101 and thus the device reader 101 will (when optimal alignment is achieved) occlude part of the separate device 103 but not the whole separate device 103.

In such embodiments, the first image can comprise a representation of at least part of the separate device 103 which is occluded by the device reader 101 when the two devices 101, 103 are aligned perfectly. Thus, when the two devices 101, 103 are aligned, the displayed image can essentially fill in the gap in the visual impression of the device which is created by the occlusion by the device reader 101. Thus, the user will effectively complete the perceived image by aligning the display such that it shows the occluded parts of the device reader 101.

Thus, in this scenario, the display effectively presents an image of some of the features of the device, where the features shown are those that are blocked or occluded by the device reader 101 when this is held by the user as desired for coupling the antennas 105, 107.

As the separate device 103 extends beyond the display and the device reader 101 in at least one direction, part of the separate device 103 will be visible to the user, and the displayed image is generated to match this part of the device. Thus, the image is generated such that when the device reader 101 and separate device 103 are properly aligned there, will be a smooth transition between the visual impression provided by the separate device 103 itself and that provided by the displayed image. In order to provide the best match between the device and the displayed image of the device, the displayed image is generated to present the separate device 103 at the same physical size as the actual separate device 103.

The approach may be advantageous in many scenarios and for many devices. In particular, it may provide more visual information to the user of the separate device 103 which can assist in the alignment. For example, it may include texture, surface patterns, logos etc. which are present on the separate device 103 and which can be used to align the devices 101, 103 (as e.g. illustrated in FIG. 3).

Also, the approach may be perceived as convenient to users. A further advantage of the approach is that the display 205 can also be used to provide user information to the user, as the user can view an un-occluded screen. For example, the display 205 may simultaneously be used to provide operating instructions to the user or to provide e.g. control or feedback to the user. For example, a signal strength or similar indication can be displayed to provide further information on the coupling between the antennas 101, 103.

Embodiments wherein the user is guided to position the separate device 103 in front of the device reader 101 may be particularly suited to some devices or device readers wherein this will result in a closer coupling between the antennas 105, 107.

The approach is also particularly suitable to scenarios wherein the separate device 103 is e.g. significantly smaller than the device reader 101. For example, if the separate device 103 is much smaller than the device reader 101, the device reader 101 may potentially completely occlude the separate device 103 when the two antennas are aligned. However, if the display 205 presents a representation of part, or possible the whole, of the separate device 103, this can be used to position the separate device 103 on top of the display 205 such that it will match or fit the displayed representation. This approach can be used even if the separate device 103 is completely within the boundaries of the device reader 101 or even of the display 205.

In such embodiments, the first image may comprise a representation of an outline of at least part of the separate device (103). In some embodiments, the first image may be generated to include a representation of the outline of the separate device 103 e.g. by suitable lines. The first image is generated such that when it is displayed, it will match the projection of the outline of the physical separate device 103 on the display 205 when the device reader 101 and the separate device 103 are optimally aligned (and thus when the two antenna positions are aligned).

A user will accordingly see a full size outline of the separate device 103 (or part of it) on the display 205 and can then proceed to position the separate device 103 on top such that the edges of the separate device 103 match the outline in the displayed image. By performing this operation, the two antennas 105, 107 will then be aligned.

In some embodiments, the displayed image may include an image of part of the separate device, such as e.g. a surface. The user may then seek to occlude the displayed parts of the separate device 103 by the separate device 103 itself, such that the visual impression of the separate device 103 matches that provided by the display 205 when not occluded by the separate device 103.

In many embodiments, the device reader 101 may potentially be used with a wide range of separate devices. For example, a smartphone may be used with a range of toothbrushes from different manufactures, or with completely different devices, such as kitchen appliances. Therefore, the device reader 101 may in many embodiments be arranged to display different images for different NFC setups.

In many embodiments, the display processor 207 may be arranged to retrieve the second image from a plurality of images depending on an indication of the specific identity or type of the separate device 103. For example, the image generator 503 may in many embodiments comprise an image store which stores a plurality of images of different devices together with identity data (either of the individual device or of a model or a type of device). The display processor 207 may be arranged to extract the second image, corresponding to the separate device 103 with which the current NFC communication link is setup, from the plurality of images.

This may for example be done in response to an indication of the separate device 103 received from the separate device 103, e.g. over the NFC communication link itself. For example, when the device reader 101 detects the presence of the separate device 103, it may seek to read the separate device 103 to determine which specific device this is. If successful, the display processor 207 may then access the image store of the image generator 503 to extract the second image corresponding to the identified device. It may then generate the first image which is displayed on the display of the device reader 101 thereby causing the user to properly align the devices.

In some embodiments, the selection of the first image may be based on the user application that is activated to read the data from the separate device 103. For example, if the user initiates the application for downloading and analyzing tooth brushing data, the display processor 207 may retrieve the image for the user's toothbrush and present this.

In yet other embodiments, the selection of the appropriate image may be based on user input. Indeed, in some embodiments, the user may directly select which image to use.

Figure 6:
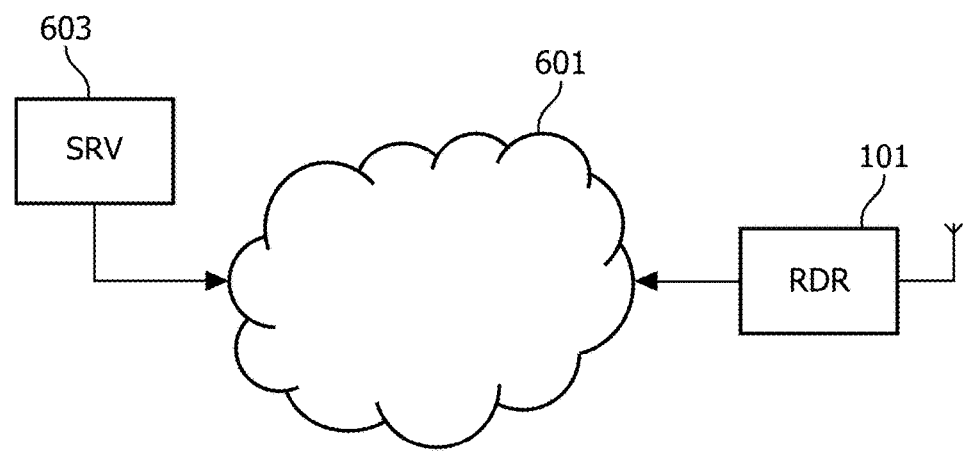
FIG. 6 illustrates an example of a system comprising a device reader and a remote server in accordance with some embodiments of the invention.

In some embodiments, the displayed image is derived from an image received from a remote server. For example, the first or second image may be received from a remote server. For example, as illustrated in FIG. 6, the device reader 101 may be coupled to a network 601 which is also coupled to a remote server 603. The network 601 may be any network and may specifically be or comprise the Internet. The device reader 101 may be coupled to the network 601 through any suitable means. For example, the device reader 101 may be a smartphone which has data communication functionality for wirelessly coupling to the Internet or to a Local Area Network (LAN) which may then possibly be connected to the Internet.

In the example, the remote server 603 may comprise a large store of images including images for a large number of different devices. In addition, the store may store data defining where the NFC antenna is positioned in each of the devices. The remote server 603 may for example be operated by an independent 3$^{rd}$ party which may allow any manufacturer to upload relevant images and data to the server for storage.

Figure 7:
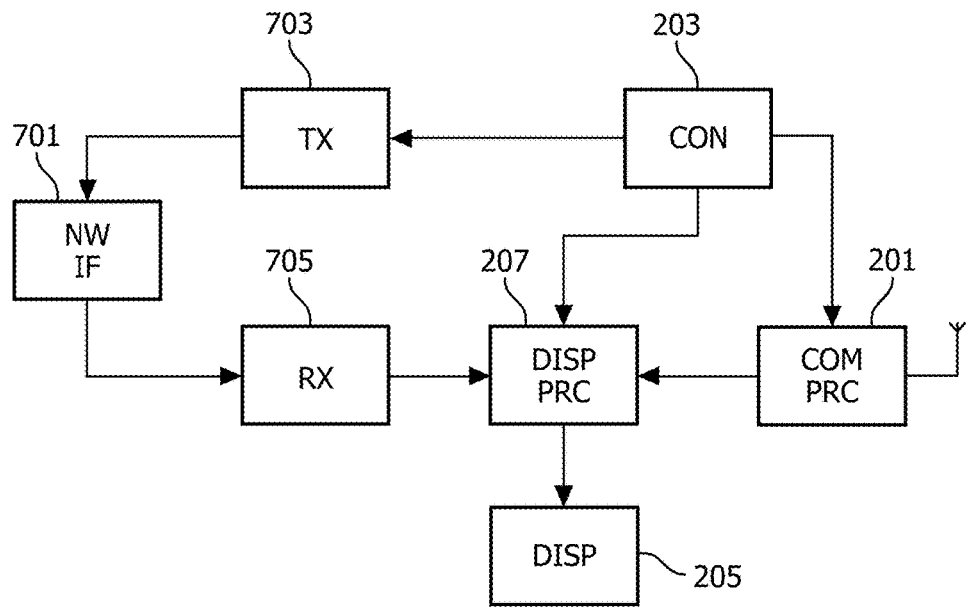
FIG. 7 illustrates an example of elements of a device reader in accordance with some embodiments of the invention.

FIG. 7 illustrates an example of a device reader 101 for an embodiment in which images are retrieved from a remote server 603. The device reader 101 may correspond to the device reader 101 of FIG. 2 but further includes functionality for retrieving images from the remote server 603.

The device reader 101 of FIG. 7 comprises a network interface 701 which is arranged to couple the device reader 101 to the network 601. The network interface 701 may include the necessary or desired functionality for communicating with the remote server 603 over the network 601. For example, the network interface 701 may include wireless communication functionality, Internet Protocol communication functionality etc. required to allow the device reader 101 to wirelessly communicate over the Internet.

The network interface 701 is coupled to a message transmitter 703 which is further coupled to the device controller 203. The message transmitter 703 is arranged to generate and transmit a request message to the remote server 603. The request message requests that the remote server 603 transmits an image back to the device reader 101. Thus, in response to receiving the request message, the remote server 603 may transmit data back to the device reader 101 via the network 601 where the data may include an image of the separate device 103. Accordingly, the device reader 101 further comprises a data receiver 705 which is coupled to the network interface 701 and to the display processor 207, and which is arranged to receive the data from the remote server 603 and to extract the included image and forward it to the display processor 207.

In some embodiments, the request message may include an indication of the separate device 103. For example, device identification data may be included. This device identification data may e.g. indicates the identity of an individual device, or more typically it may provide an indication of the type or model of the separate device 103. E.g. a request message may be transmitted to the separate device 103 which comprises data specifying the manufacturer and model of the separate device 103 (such as e.g. the manufacturer and model number of the toothbrush).

The separate device 103 may then use the provided identification data to find a suitable image. Specifically, it may search through its store of images and find an image matching the identification data. For example, an image of the indicated toothbrush model from the indicated manufacturer may be identified and communicated back to the device reader 101 together with an indication of the NFC antenna position in the image.

When receiving the image from the data receiver 705, the display processor 207 may proceed to generate the image to be displayed as previously described for the example where the images are stored locally in the device reader 101. Thus, rather than retrieving the second image from a local storage, the device reader 101 may receive it from a remote server 603. It may then generate the first image from this second image rather than from the locally stored image.

It will be appreciated that the approaches of local storage and remote storage may be combined. For example, the device reader 101 may first seek to retrieve a suitable image from a local store. If no suitable image is found, it may then proceed to access the remote server 603 to retrieve an image from there. In addition to generating the first image from this received second image, the device reader 101 may also store it locally for future use.

In some embodiments, the device reader 101 may in addition to the identification data for the separate device 103 also transmit data characterizing the device reader 101 itself. This data may for example be identification data e.g. identifying a type or model of the device reader 101, or may e.g. be data indicative of one or more characteristics of the device. For example, the data may include an indication of a physical size and a pixel resolution of the display. In addition, the corresponding device reader antenna position may be provided.

In such embodiments, the remote server 603 may use the provided information to generate an image that is adapted to the specific characteristics of the device reader 101. Thus, in this scenario, the remote server 603 may return an image which is specific for the combination of the specific separate device 103 and device reader 101. In many embodiments, the image may be displayed as received by the device reader 101. Thus, in such embodiments, the remote server 603 may directly provide the first image ready for displaying by the display processor 207.

In some embodiments, the request message may comprise an indication of a characteristic of the device reader 101 but may not include any indication for the separate device 103. This may for example be the case where the remote server 603 is dedicated to one specific separate device but provides images suitable for a range of different device readers.

For example, a server may be set up by a manufacturer of a specific toothbrush. In addition, an application may be provided to toothbrush users where the application is not specific to just one device reader 101. For example, an Android or iOS application may be published which can be downloaded to a range of different smartphones. A given smartphone running the application to analyze toothbrush data may then send a request message to the server where the request message includes an indication of the specific smartphone used. In response, the server may retrieve an image of the toothbrush optimized for that smartphone and send it to the smartphone. The smartphone may directly present the received image on the display. By aligning the toothbrush with the image on the display, the NFC antennas will be aligned and optimized NFC data exchange can be achieved.

Figure 8:
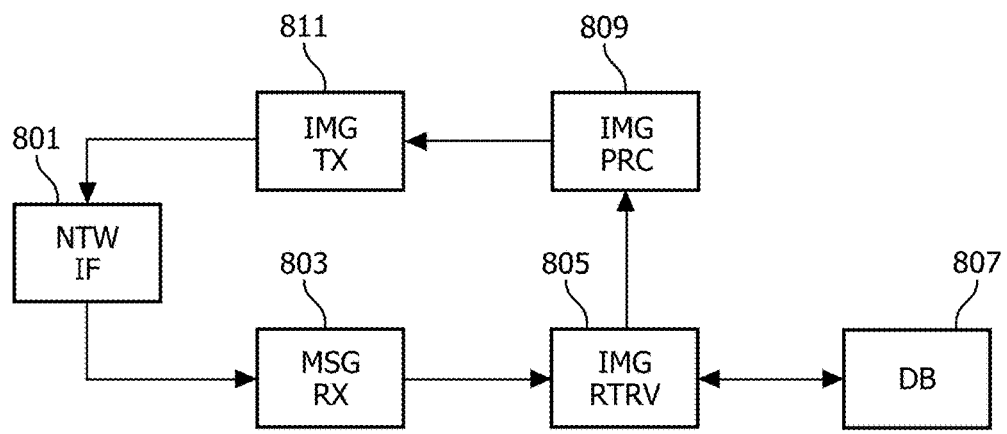
FIG. 8 illustrates an example of elements of a server in accordance with some embodiments of the invention.

FIG. 8 illustrates an example of elements of a remote server which specifically may be the remote server 603 illustrated in FIG. 1. The remote server 603 may provide an image to the device reader 101 which in the specific example may be used directly by the device reader 101, i.e. the image provided by the remote server 603 may already be customized to the device reader 101, and in the specific example is customized to the specific combination of the device reader 101 and the separate device 103. Thus, in the specific example, the separate device 103 provides the first image (i.e. an image customized to the display and antenna position alignment) to the device reader 101.

The separate device 103 comprises a network interface 801 which interfaces the separate device 103 to the network 601, and in the specific example comprises the required functionality for interfacing the separate device 103 to the Internet.

The network interface 801 is coupled to a message receiver 803 which receives the request message from the device reader 101. It then proceeds to extract the data of the request message and in the specific example, it extracts the identification data for the device reader 101 and for the separate device 103.

The message receiver 803 is coupled to an image retriever 805 which receives the identification data. The image retriever 805 is coupled to an image store 807 which comprises a potentially large data base of images of different devices that may be used with a device reader. For example, the data base may comprise images of toothbrushes, blenders, washing machines, etc. that are able to communicate via NFC communication links.

In some embodiments, the data base may comprise multiple images for each possible device, and indeed may comprise images that are already customized for specific device readers. For example, an image of a given device, say a toothbrush, may be stored for a range of different smartphones.

Based on the received identification data, the image retriever 805 proceeds to retrieve the corresponding image from the image store 807. Specifically, the image corresponding to the device identified by the separate device identification data is extracted from the data base. If a plurality of images is stored for different device readers, the image retriever 805 may further select the image corresponding to the device reader identification data. If no match is found for the specific device reader, a default image may be retrieved.

In some embodiments, the retrieved image may be transmitted back to the device reader 101 without any modifications or image processing being performed at the separate device 103. If the image is a default image which is not customized to the specific device reader 101, this corresponds to transmitting the second (non-customized) image back to the device reader 101 which may then proceed to customize it as previously described. If the image is however one that has already been customized to the specific device reader 101, this may be considered to correspond to a transmission of the first image to the device reader 101 where the first image can be used directly.

However, in the example of FIG. 8, the image retriever 805 is coupled to an image processor 809 which is arranged to apply image processing to the retrieved image in order to customize it to the specific device reader 101 (if the retrieved image is one that has already been customized, the image processor 809 may simply forward the image without applying any image processing).

In the example, the image processor 809 thus receives a second image which is not customized to the specific device reader 101 and from this it generates a first image which is customized to the specific device reader 101. The image processing performed by the image processor 809 is based on the first image antenna position for the antenna 105 of the device reader 101, the second image antenna position for the antenna 107 of the separate device 103 and on a display characteristic. Specifically, the image processor 809 may generate the first image using the first image antenna position as a target position in the first image for the second image antenna position.

The first image antenna position may be provided in the request message, e.g. as a pixel position on the display. The display characteristic may specifically be a size, pixel resolution or pixel size for the display of the device reader 101 and may also be provided by data in the request message.

In some embodiments, the separate device 103 may itself be arranged to determine the first image antenna position and/or the display characteristic for the specific device reader 101. For example, the image processor 809 may comprise a data base which for a large number of possible device readers (such as a large number of smartphones) comprise data characterizing the display size, resolution and appropriate NFC antenna position. The image processor 809 may accordingly extract the data stored for the specific device reader type identified by the device reader identification data.

The second image antenna position may typically be stored together with the device image in the image store 807 and may thus be retrieved by the image retriever 805 together with the image.

The image processor 809 may then proceed to generate the first (customized) image from the retrieved second (non-customized) image. The image processor 809 may specifically proceed to scale, rotate and position at least part of the second image in the first image as previously described for the image processor 501.

The resulting first image may then be fed to an image transmitter 811 which is coupled to the network interface 801 and which is arranged to transmit the first image to the device reader 101. The device reader 101 may then use the first image directly without needing to perform image processing to customize the image to the specific device reader 101.

The use of a remote server to provide the image may be advantageous in many embodiments as it may allow a single centralized server to support a large number of device readers. This may for example substantially reduce the memory requirements in the individual device readers, and may also reduce the computational burden. Furthermore, it may facilitate provision and distribution of suitable images as well as information on the antenna positions. For example, a manufacturer of a device supporting NFC can simply upload an image and associated information to one centralized server.

Previously, a number of specific examples of how a customized image can be generated have been described. The customized image was specifically generated such that when presented on the display of the device reader 101, the positioning of a separate device to be aligned with the image on the display will result in the NFC antennas of the device reader and the separate device to be aligned with each other. Specifically, the alignment may be such that the distance between the device reader antenna position and the first image antenna position is substantially minimized when the customized image is displayed. The customization of the image to be displayed may specifically be such that the device reader antenna position and the second antenna position coincide. In some embodiments or scenarios, the distance between the first and second antenna positions may be subject to other criteria or requirements.

As previously described, the customized image may be generated from the non-customized image by e.g. performing translations, rotations and scalings. Furthermore, the image operations may be dependent on various display properties, such as e.g. a size of the display; an orientation of the display; a resolution of the display and/or a pixel size of the display.

However, it will be appreciated that different image processing operations may be applied in different embodiments and for different images and displays. Indeed, although various specific examples of possible image processing approaches are described, it will be appreciated that these are merely exemplary and that other approaches may be used in other embodiments.

For example, the customized image may be generated from the non-customized image by a scaling of the image in such a way that when the device reader 101 is placed in an optimal way for NFC transaction, the image has the same scale/size as the separate device 103. For example when the separate device 103 is a tooth brush, and part of the body is shown on the display, the width of the body (in mm) shown on the display is similar to the (visually perceived) width of the product size. Also when there are patterns on the product, the scaling (e.g. in the X, Y direction) is performed such that the aspect ratio of the pattern is the same.

As another example, translation of the image may be used to place the image on the display of the device reader such that it guides the user to place the spot where the antenna is located in the device reader on top of the antenna inside the separate device 103. E.g. a tablet may have a display and product body which is much larger than the actual antenna side. By translating the image to say the corner where the antenna is located, the user will understand where the location of the antenna is inside the tablet. For different tablet types, size and applied NFC technologies, the antenna size, location and even orientation may be different.

Typically when using e.g. a smartphone in one orientation, say in landscape mode, the image can be rotated in such way that the antennas are aligned properly for this orientation. If the smartphone shifts orientation, e.g. to portrait mode, the image may be rotated accordingly. It is often more advantageous to use one orientation over others, and by rotating the image accordingly an improved user experience can be achieved.

It will be appreciated that other image operations than simple scaling, translation or rotations may be used. For example if the antenna is bent inside the device reader (e.g. in a wrist watch) or the separate device 103 has a slope or curve where the antenna is positioned, the antenna may not be planar. In such cases, e.g. an affine or projective image transformation could be used to correct the guiding image on the mobile device in such a way that the total visual representation (of the separate device and the image on the display of the device reader) intuitively fits together. With affine transformations it is for example possible to skew an image or change a square image into a trapezoid shape.

Although the previous description has focused on the device reader being (part of) a smartphone or similar device, it will be appreciated that the device reader may be any suitable device or may be part of any suitable device. For example, it may be a watch, bracelet, E-ink devices/digital paper, credit size devices with screens etc.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A device reader for receiving data from a separate device using Near Field Communication (NFC), the device reader comprising:
    a display;
    a first antenna for receiving the data from the separate device, the first antenna having a first antenna position relative to the display; and
    a display processor for displaying on the display a first image of at least a part of the separate device containing a second antenna position corresponding to a position of an antenna in the separate device, wherein the display processor is configured to display the first image by accessing a local or remote storage in response to detecting the separate device, and wherein the display processor is configured to display the first image in order to align the first antenna position with the second antenna position.

2. The device reader of claim 1, further comprising:
    an image generator for providing a second image of at least the part of the separate device, the second image having an associated second image antenna position corresponding to the position in the second image of the antenna in the separate device; and
    an image processor for generating the first image from the second image in response to the device reader antenna position, the second image antenna position, and a display property of the display.

3. The device reader of claim 2, further comprising:
    a transmitter for transmitting an indication of at least one of the device reader and the separate device to a remote server; and
    a receiver for receiving the second image from the remote server.

4. The device of claim 1, further comprising:
    a transmitter for transmitting an indication of at least one of the device reader and the separate device to a remote server; and
    a receiver for receiving the first image from the remote server.

5. The device reader of claim 1, wherein the display processor is configured to display the first image independently of a movement of the device reader.

6. The device reader of claim 1, wherein the first image is a still image.

7. The device reader of claim 1, wherein the alignment between the first antenna position and the second antenna position is independent of either a device reader position or a separate device position.

8. The device reader of claim 1, wherein the first image comprises a representation of an outline of at least the part of the separate device corresponding to an outline of the separate device projected on the display when the separate device is positioned in front of the device reader and the first antenna position is aligned with the second antenna position.

9. A method of operating a device reader for receiving data from a separate device using Near Field Communication (NFC), comprising:
    providing a display;
    providing a first antenna for receiving the data from the separate device, the first antenna having a first antenna position relative to the display; and
    displaying on the display a first image of at least a part of the separate device containing a second antenna position corresponding to a position of an antenna in the separate device, wherein the first image is displayed by accessing a local or remote storage in response to detecting the separate device, and wherein the first image is displayed in order to align the first antenna position with the second antenna position.

* * * * *